(12) United States Patent
Gonda et al.

(10) Patent No.: US 10,865,686 B2
(45) Date of Patent: Dec. 15, 2020

(54) EXHAUST DEVICE OF ENGINE

(71) Applicant: MAZDA MOTOR CORPORATION, Hiroshima (JP)

(72) Inventors: Ryohei Gonda, Hiroshima (JP); Koichi Yashiro, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/439,984

(22) Filed: Jun. 13, 2019

(65) Prior Publication Data
US 2019/0390587 A1 Dec. 26, 2019

(30) Foreign Application Priority Data
Jun. 26, 2018 (JP) .................................. 2018-121286

(51) Int. Cl.
*F01N 3/28* (2006.01)
*F02B 67/10* (2006.01)

(52) U.S. Cl.
CPC ............ *F01N 3/2892* (2013.01); *F02B 67/10* (2013.01); *F01N 2240/20* (2013.01); *F01N 2470/18* (2013.01)

(58) Field of Classification Search
CPC ............... F01N 3/2892; F01N 2240/20; F01N 2470/18; F01N 2610/02; F01N 3/2066; F01N 2560/02; F01N 3/021; F01N 3/035; F01N 13/009; F02B 67/10
USPC .................................. 60/277, 295, 299, 301
See application file for complete search history.

(56) References Cited

U.S. PATENT DOCUMENTS 3,376,695 A * 4/1968 Muckley .................. F01N 3/08
96/147
3,556,734 A * 1/1971 Muckley ................ B01D 47/06
422/171
7,104,051 B2 * 9/2006 Shimasaki ............ F01N 3/0253
60/274

(Continued)

FOREIGN PATENT DOCUMENTS

DE     102011108237 A1     1/2013
EP         2343440 A1      7/2011

(Continued)

OTHER PUBLICATIONS

Extended European Search Report issued by the European Patent Office dated Oct. 7, 2019, which corresponds to EP19180897.1—1004 and is related to U.S. Appl. No. 16/439,984.

*Primary Examiner* — Hoang M Nguyen

(74) *Attorney, Agent, or Firm* — Studebaker & Brackett PC

(57) ABSTRACT

A connection passage 63 is provided to connect an exhaust emission control catalyst and the particulate collection filter to each other, and partially has a small cross-sectional area portion 632 the flow passage cross-sectional area of which is smaller than an area of the transverse section of the particulate collection filter. The enlarged portion 633 having a flow passage cross-sectional area enlarged to be approximately as large as the area of the transverse section of the particulate collection filter is formed at the connection portion with the particulate collection filter in the connection passage 63, and the guide wall portion 634 is provided in the enlarged portion 633 to allow the exhaust gas having passed through the small cross-sectional area portion 632 to swirl along the peripheral wall of the enlarged portion 633.

9 Claims, 12 Drawing Sheets

(56) References Cited

U.S. PATENT DOCUMENTS

| | | |
|---|---|---|
| 7,891,176 B2* | 2/2011 | Konstandopoulos ........................ F01N 3/0222 60/276 |
| 2010/0107612 A1* | 5/2010 | Yamazaki ............. F01N 3/2892 60/295 |
| 2015/0308316 A1 | 10/2015 | Li et al. |
| 2016/0053663 A1* | 2/2016 | Davison .............. F01N 13/1822 60/301 |
| 2016/0298517 A1 | 10/2016 | Cossard et al. |
| 2016/0312678 A1 | 10/2016 | Siddhanthi et al. |
| 2018/0030875 A1 | 2/2018 | Kamo et al. |

FOREIGN PATENT DOCUMENTS

| | | |
|---|---|---|
| JP | 2018-017146 A | 2/2018 |
| WO | 2015/028647 A1 | 3/2015 |

* cited by examiner

VEHICLE RIGHT SIDE ⟵⟶ VEHICLE LEFT SIDE

VEHICLE RIGHT SIDE ←⎯⎯→ VEHICLE LEFT SIDE

VEHICLE RIGHT SIDE ←——→ VEHICLE LEFT SIDE

EXHAUST DEVICE OF ENGINE

CROSS-REFERENCE TO RELATED APPLICATION

This application claims priority to Japanese Patent Application No. 2018-121286 filed on Jun. 26, 2018, the entire disclosure of which is incorporated by reference herein.

BACKGROUND

The technique disclosed herein belongs to a technical field related to an exhaust device of an engine.

In the related art, there has been known an exhaust device of an engine. The exhaust device includes an exhaust passage provided with an exhaust emission control catalyst and a particulate collection filter.

For example, Japanese Unexamined Patent Publication No. 2018-17146 discloses an exhaust device in which an exhaust emission control device (an exhaust emission control catalyst) includes a case having a flat transverse section including a pair of opposing short sides and a pair of opposing long sides and configured to store a catalyst converter and an inlet cone having a cone part composed of inclination walls inclined to an exhaust gas mainstream direction so that a transverse section of a flow passage for exhaust gas expands and configured to connect an outlet of a turbine and an inlet of the case to each other, and at a portion on the inclination wall of the cone part corresponding to each of the pair of long sides, concave parts are formed so as to be recessed inwardly.

Furthermore, in the exhaust device of Japanese Unexamined Patent Publication No. 2018-17146, below the exhaust emission control device, a diesel particulate filter (a particulate collection filter) received in a case having a flat transverse section is disposed as a second exhaust emission control device. The diesel particulate filter includes a pair of opposing short sides and a pair of opposing long sides. Moreover, in the exhaust device of Japanese Unexamined Patent Publication No. 2018-17146, an outlet (a connection passage), which connects the exhaust emission control device and the diesel particulate filter to each other, is provided with a part having a flow passage cross-sectional area narrower than an area of a transverse section of the diesel particulate filter.

It is desirable that an exhaust device provided in an engine is made as compact as possible so as to be received in an engine room even though the engine room is narrow. When the exhaust emission control catalyst or the particulate collection filter has a flat shape as disclosed in Japanese Unexamined Patent Publication No. 2018-17146, if the engine room is relatively narrow, the exhaust emission control catalyst and the particulate collection filter can be efficiently disposed in the vicinity of the engine, so that a compact configuration can be achieved.

However, as disclosed in Japanese Unexamined Patent Publication No. 2018-17146, when the flow passage cross-sectional area of a part of the connection passage is narrower than the area of the transverse section of the particulate collection filter, since exhaust gas is collected in a narrow range, deviation may occur in the velocity distribution of the exhaust gas flowing into the particulate collection filter. When the deviation occurs in the velocity distribution of the exhaust gas flowing into the particulate collection filter could deteriorate exhaust emission control performance of the particulate collection filter. Furthermore, when the particulate collection filter is regenerated by burning off particles collected in the particulate collection filter by high temperature exhaust gas, the temperature distribution of the particulate collection filter may not be uniform. Therefore, there is room for improvement from the viewpoint of making the velocity distribution of the exhaust gas uniform.

The technique disclosed herein has been made to solve the aforementioned problems, and the technique disclosed herein is to make the velocity distribution of exhaust gas flowing into a particulate collection filter having a flat shape as uniform as possible, thereby enabling the particulate collection filter to be appropriately regenerated.

SUMMARY

In order to solve the aforementioned problems, the technique disclosed herein provides an exhaust device of an engine including an exhaust emission control catalyst provided in an exhaust passage of the engine; a particulate collection filter disposed on a downstream side of the exhaust passage in an exhaust flow direction from the exhaust emission control catalyst and is adjacent to the exhaust emission control catalyst; and a connection passage that connects the exhaust emission control catalyst and the particulate collection filter to each other, the particulate collection filter has a transverse section having a flat shape and including a pair of opposing short sides and a pair of opposing long sides, the connection passage partially has a small cross-sectional area portion a flow passage cross-sectional area of which is smaller than an area of the transverse section of the particulate collection filter, an enlarged portion is formed in a connection portion with the particulate collection filter in the connection passage, the enlarged portion having a flow passage cross-sectional area enlarged from upstream to downstream in the exhaust flow direction so as to be as large as the area of the transverse section of the particulate collection filter, and a guide wall portion is provided in the enlarged portion to allow exhaust gas having passed through the small cross-sectional area portion to swirl along a peripheral wall of the enlarged portion.

According to such a configuration, in the connection passage, the small cross-sectional area portion having a flow passage cross-sectional area smaller than the area of the transverse section of the particulate collection filter is partially formed. Therefore, the exhaust gas is collected in a narrow range when passing through the small cross-sectional area portion and then flows into the particulate collection filter. When the exhaust gas collected in the narrow range flows into the particulate collection filter as is, since deviation occurs in the velocity distribution of the exhaust gas, exhaust emission control performance of the particulate collection filter may deteriorate. Furthermore, since the temperature distribution of the particulate collection filter is not uniform, the regeneration of the particulate collection filter is not appropriately performed. Particularly, in the aforementioned configuration, since the particulate collection filter has a flat shape, the temperature distribution is likely to be non-uniform.

On the other hand, in the aforementioned configuration, the enlarged portion is formed to so that the flow passage cross-sectional area is enlarged so as to be approximately as large as the area of the transverse section of the particulate collection filter, and the guide wall portion is provided in the enlarged portion to allow the exhaust gas having passed through the small cross-sectional area portion to swirl along the peripheral wall of the enlarged portion. In this way, the exhaust gas flowing into the enlarged portion from the small cross-sectional area portion swirls along the peripheral wall of the enlarged portion and is spread over the entire transverse section of the enlarged portion. Since the flow passage cross-sectional area of the enlarged portion is finally approximately as large as the area of the transverse section of the particulate collection filter, when the exhaust gas flows into the particulate collection filter, the exhaust gas is distributed over the entire transverse section of the particulate collection filter. Consequently, the velocity distribution of the exhaust gas flowing into the particulate collection filter having the flat shape is made as uniform as possible, so that the particulate collection filter can be appropriately regenerated.

In an embodiment of the exhaust device of the aforementioned engine, the exhaust emission control catalyst is supported to a side wall portion of an engine body of the engine so as to extend in a cylinder row direction, the particulate collection filter is disposed below the exhaust emission control catalyst, extends in the cylinder row direction, and is supported to the side wall portion of the engine body such that the pair of long sides in the flat shape extend in a vertical direction, the connection passage is connected to the exhaust emission control catalyst and the particulate collection filter such that the small cross-sectional area portion extends in the vertical direction, and the guide wall portion is formed at a portion on the peripheral wall of the enlarged portion far from the side wall portion of the engine body, extends in the vertical direction, and is curved downward so as to approach the side wall portion of the engine body.

According to such a configuration, since the small cross-sectional area portion and the guide wall portion extend in the vertical direction, the exhaust gas flowing out from the small cross-sectional area portion flows smoothly along the guide wall portion. Furthermore, the guide wall portion formed at the portion on the peripheral wall of the enlarged portion far from the side wall portion of the engine body is curved downward so as to approach the side wall portion of the engine body, so that the exhaust gas flows along the guide wall portion and then flows so as to swirl along the peripheral wall of the enlarged portion. As a consequence, the exhaust gas can be swirled smoothly along the peripheral wall of the enlarged portion, so that it is possible to improve the uniformity of the velocity distribution of the exhaust gas flowing into the particulate collection filter having the flat shape.

Furthermore, the particulate collection filter extends in the cylinder row direction and is supported to the side wall portion of the engine such that the pair of long sides in the flat shape extends in the vertical direction. Hence, so that the exhaust device can be compactly configured.

In the aforementioned embodiment, the exhaust emission control catalyst may be inclined and positioned further downward to approach the connection portion with the connection passage.

According to such a configuration, the exhaust gas having passed through the exhaust emission control catalyst flows smoothly toward the small cross-sectional area portion extending in the vertical direction. In this way, in the connection passage, the exhaust gas flows smoothly to the guide wall portion. As a consequence, the exhaust gas can be swirled more smoothly, so that it is possible to further improve the uniformity of the velocity distribution of the exhaust gas flowing into the particulate collection filter having the flat shape.

In the aforementioned embodiment, the connection passage may be inclined downward so as to approach the particulate collection filter when viewed from a direction perpendicular to a surface of the side wall portion of the engine body.

According to such a configuration, a flow component toward the particulate collection filter can be provided to the exhaust gas flowing through the connection passage, so that the exhaust gas swirling along the peripheral wall of the enlarged portion by the guide wall portion flows smoothly toward the particulate collection filter. In this way, it is possible to further improve the uniformity of the velocity distribution of the exhaust gas flowing into the particulate collection filter having the flat shape.

In the aforementioned embodiment, an exhaust gas sensor may be mounted on a portion on the peripheral wall of the enlarged portion, which faces the guide wall portion, to detect a state of the exhaust gas.

That is, the connection passage is generally provided with an exhaust gas sensor for detecting the state (for example, temperature or pressure) of the exhaust gas. Since the exhaust gas sensor is provided on the portion on the peripheral wall of the enlarged portion, which faces the guide wall portion, when a swirl component is applied to the exhaust gas by the guide wall portion, the exhaust gas sensor does not become an obstacle. In this way, it is possible to further improve the uniformity of the velocity distribution of the exhaust gas flowing into the particulate collection filter having the flat shape.

The aforementioned exhaust device of the engine may further include a first selective catalytic reduction catalyst is disposed adjacent to the downstream side of the particulate collection filter and reduces NOx in the exhaust gas by a supplied reducing agent; and a reducing agent supply device provided on an upstream portion of the connection passage in the exhaust flow direction from the small cross-sectional area portion so as to supply the reducing agent.

That is, the reducing agent to the selective catalytic reduction catalyst is generally supplied by injection into the exhaust gas flowing through the exhaust passage to send the reducing agent to the selective catalytic reduction catalyst by the flow of the exhaust gas. As with the aforementioned configuration, when the reducing agent supply device is disposed on the upstream portion of the connection passage in the exhaust flow direction from the small cross-sectional area portion, the reducing agent supplied to the exhaust gas from the reducing agent supply device is spread over the entire transverse section of the particulate collection filter by the exhaust gas swirling along the peripheral wall of the enlarged portion. In this way, the distribution of the reducing agent supplied to the first selective catalytic reduction can be made as uniform as possible.

In the exhaust device of the engine provided with the aforementioned first selective catalytic reduction catalyst, a second selective catalytic reduction catalyst having a function equivalent to a function of the first selective catalytic reduction may be supported on the particulate collection filter.

According to such a configuration, it is possible to improve the emission control performance of $NO_x$ in the exhaust gas in the exhaust device.

Furthermore, the reducing agent supplied to the exhaust gas from the reducing agent supply device is spread over the entire transverse section of the particulate collection filter by the exhaust gas swirling along the peripheral wall of the enlarged portion, so that the distribution of the reducing agent supplied to the second selective catalytic reduction can also be made as uniform as possible.

As described above, according to the technique disclosed herein, even though the particulate collection filter has the flat shape and the connection passage, which connects the exhaust emission control catalyst and the particulate collection filter to each other, is provided with a part having a flow passage cross-sectional area narrower than the area of the transverse section of the particulate collection filter, the velocity distribution of the exhaust gas flowing into the particulate collection filter having the flat shape is made as uniform as possible by allowing the exhaust gas to swirl, so that the particulate collection filter can be appropriately regenerated.

DETAILED DESCRIPTION

Hereinafter exemplary embodiments will be described in detail with reference to the drawings.

First Embodiment

Figure 1:
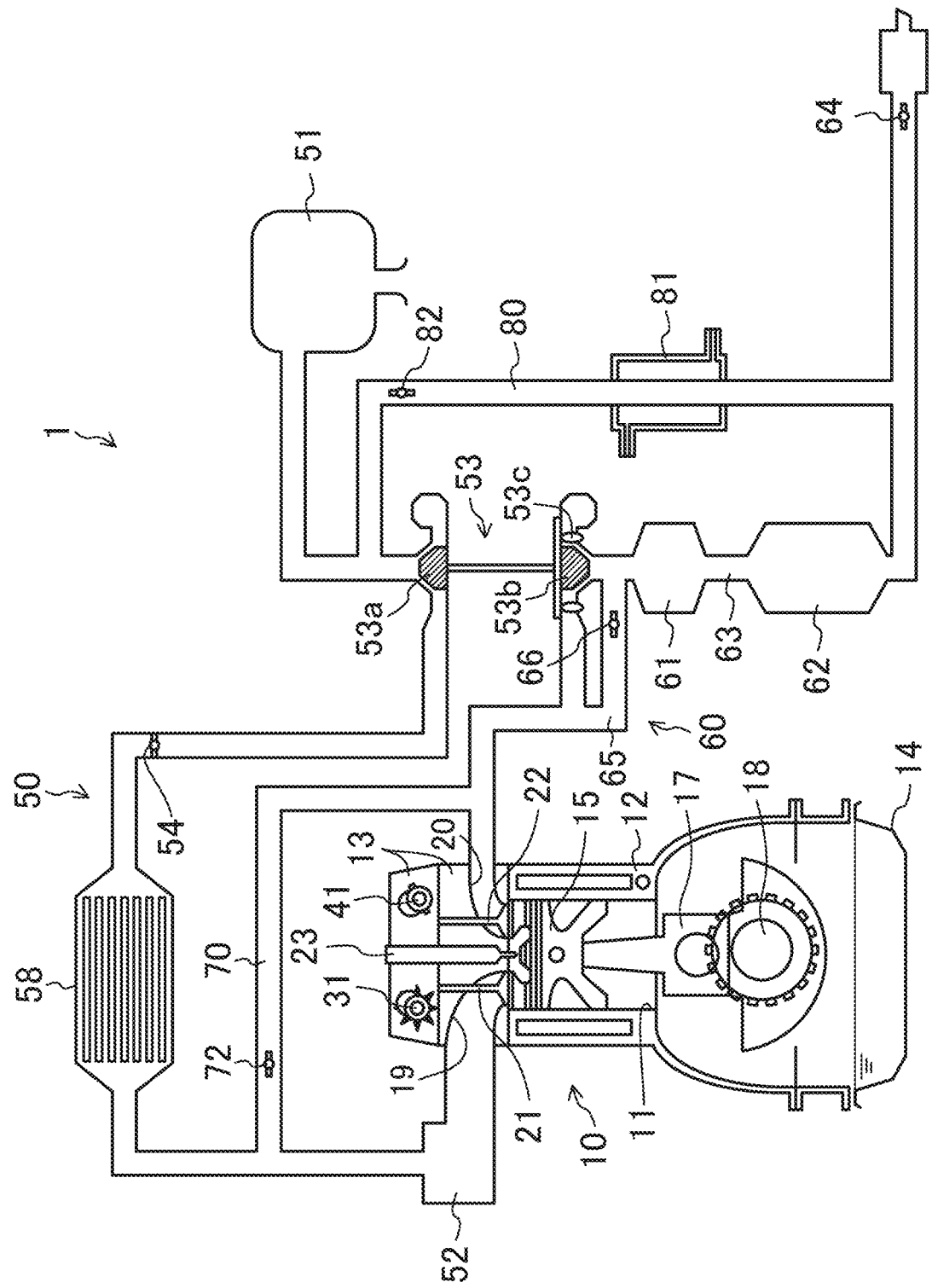
FIG. 1 is a schematic configuration view of an engine provided with an exhaust device according to a first embodiment.

FIG. 1 illustrates an engine 1 according to a first embodiment. An engine body 10 of the engine 1 is a multi-cylinder engine in which a plurality of cylinders 11 are arranged in series and is a diesel engine supplied with fuel including light oil as a main component. The engine body 10 is disposed longitudinally in an engine room of a vehicle. That is, the cylinder row direction of the engine body 10 coincides with a vehicle front and rear direction. In the following description, a left side and a right side when a vehicle front side is viewed from a vehicle rear side are referred to as a vehicle left side and a vehicle right side, respectively.

The engine body 10 includes a cylinder block 12 provided with the plurality of cylinders 11 (one cylinder alone is illustrated in FIG. 1), a cylinder head 13 disposed on the cylinder block 12, and an oil pan 14 disposed below the cylinder block 12 to store lubricating oil. In each cylinder 11 of the engine body 10, a piston 15 is inserted and fitted so as to be reciprocally slidable, and a combustion chamber is defined by the piston 15, the cylinder block 12, and the cylinder head 13. The piston 15 is connected to a crankshaft 18 via a connecting rod 17 in the cylinder block 12.

In the cylinder head 13, an intake port 19 and an exhaust port 20 are formed for each cylinder 11, and an intake value 21 and an exhaust valve 22 are respectively disposed in the intake port 19 and the exhaust port 20 to open and close openings on the combustion chamber side. Each intake port 19 and each exhaust port 20 extend in a vehicle width direction. In the present first embodiment, when the engine 1 is mounted on the aforementioned vehicle, each intake port 19 is located in the cylinder head 13 toward the vehicle left, and each exhaust port 20 is located in the cylinder head 13 toward the vehicle right.

Each intake value 21 is opened and closed by an intake-side cam 31 and each exhaust valve 22 is opened and closed by an exhaust-side cam 41. The intake-side cam 31 and the exhaust-side cam 41 are rotationally driven together with the rotation of the crankshaft 18, respectively. Although not illustrated in the drawing, in order to adjust opening and closing timings and opening and closing periods of the intake value 21 and the exhaust valve 22, a hydraulic actuation type valve variable mechanism is provided for example.

Figure 2:
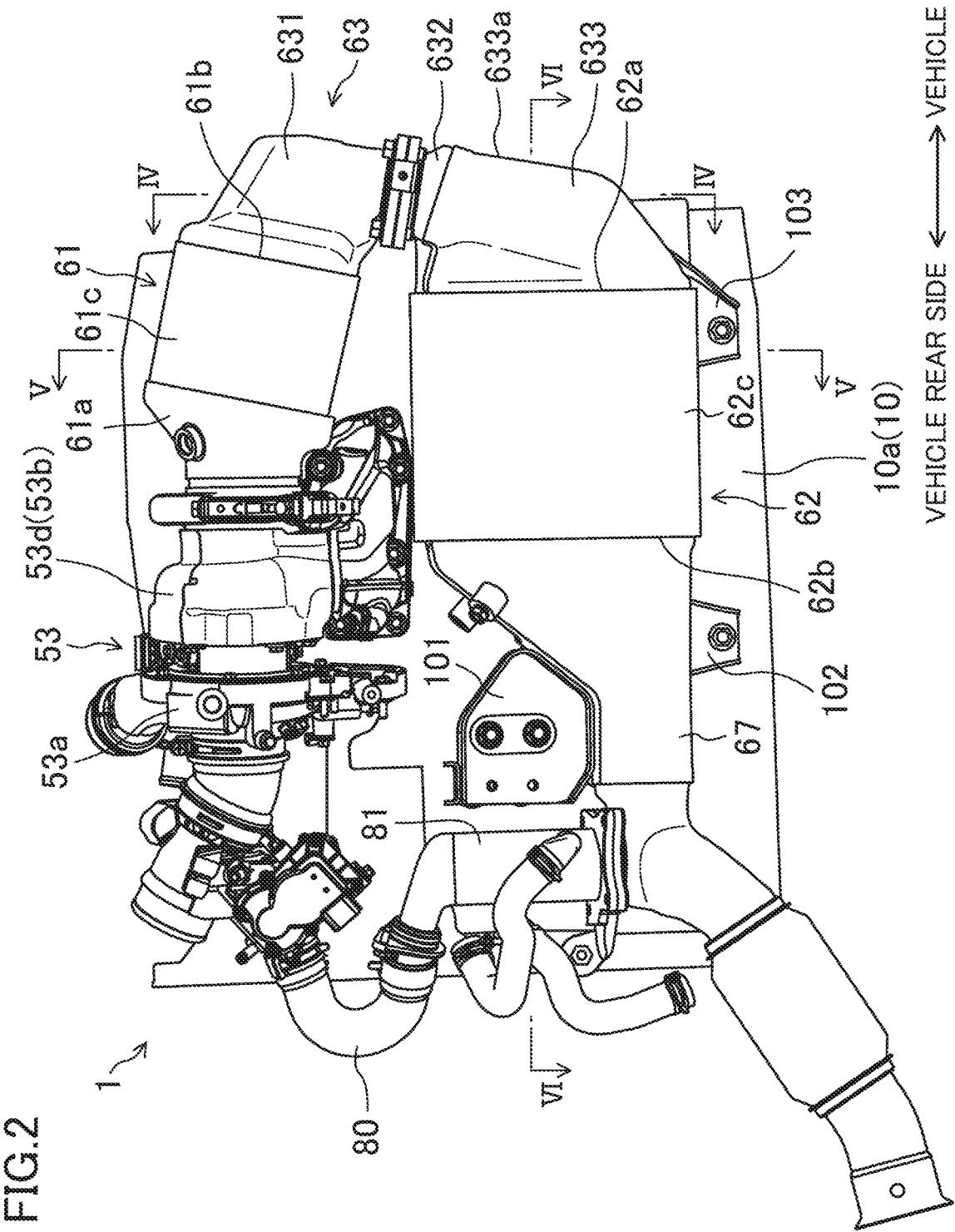
FIG. 2 is a side view when the engine is viewed from a vehicle right side.

In the cylinder head 13, an injector 23 is attached to each cylinder 11 to directly inject fuel into the cylinder 11. As illustrated in FIG. 2, the injector 23 is disposed such that its injection port faces the inside of the combustion chamber from the center part of a ceiling surface of the aforementioned combustion chamber.

As illustrated in FIG. 1, an intake passage 50 is connected to one side wall portion of the engine body 10 (a left side wall portion of the engine body 10 in the present first embodiment) so as to communicate with the intake port 19 of each cylinder 11. On the other hand, an exhaust passage 60 is connected to the other side wall portion of the engine body 10 (a right side wall portion 10a to be described later of the engine body 10) so as to discharge burned gas (that is, exhaust gas) from each cylinder 11.

An air cleaner 51 is disposed at an upstream end portion of the intake passage 50 in an intake flow direction to filter intake air. On the other hand, a surge tank 52 is disposed in the vicinity of a downstream side of the intake passage 50 in the intake flow direction. The intake passage 50 downstream from the surge tank 52 in the intake flow direction serves as an independent intake passage branched for each cylinder 11, and each of the downstream ends of the independent intake passages in the intake flow direction are connected to the respective intake ports 19 of the cylinders 11.

Between the air cleaner 51 and the surge tank 52 on the intake passage 50, a compressor 53a of a turbo charger 53, an intake control valve 54, and a water-cooled intercooler 58 as a heat exchanger are sequentially disposed from upstream to downstream in the intake flow direction.

An upstream portion of the exhaust passage 60 in an exhaust flow direction is configured by an exhaust manifold having an independent exhaust passage branched for each cylinder 11 and connected to an outer end of the exhaust port 20 and a collecting portion in which the independent exhaust passages are collected.

At a downstream side of the exhaust passage 60 in the exhaust flow direction from the aforementioned exhaust manifold, a turbine 53b of the turbo charger 53 and an oxidation catalyst 61 as an exhaust emission control catalyst are disposed. At a downstream side of the exhaust passage 60 in the exhaust flow direction from the oxidation catalyst 61, a diesel particulate filter 62 (hereinafter referred to as a DPF 62) as a particulate collection filter is disposed. Between the oxidation catalyst 61 and the DPF 62, a connection passage 63 is provided to connect the oxidation catalyst 61 and the DPF 62 to each other. At a downstream side of the exhaust passage 60 in the exhaust flow direction from the DPF 62, an exhaust shutter valve 64 is disposed.

The turbo charger 53 is configured as a variable capacity type turbo charger capable of regulating the flow rate of exhaust gas flowing into the turbine 53b by changing a flow passage cross-sectional area of the exhaust gas flowing into the turbine 53b. At an inlet of the turbine 53b, that is, at a direct upstream side of the turbine 53b on the exhaust passage 60, a movable vane 53c is disposed to adjust the flow passage cross-sectional area of the exhaust gas. The exhaust passage 60 is provided with an exhaust-side bypass passage 65 for bypassing the turbo charger 53. The exhaust-side bypass passage 65 is provided with a waste gate valve 66 that adjusts the flow rate of the exhaust gas flowing into the exhaust-side bypass passage 65. The turbine 53b and the vane 53c of the turbo charger 53 are received in a turbine case 53d (see FIG. 2).

The oxidation catalyst 61 promotes a reaction in which CO and HC in the exhaust gas are oxidized to be $CO_2$ and $H_2O$.

The DPF 62 collects particles such as soot contained in the exhaust gas of the engine 1. The DPF 62 is a renewable filter. When the DPF 62 has collected a predetermined amount of the particles, fuel is injected from the injector 23 such that unburned fuel (unburned HC) is contained in the exhaust gas. The unburned fuel is oxidized by the oxidation catalyst 61, and the temperature of the exhaust gas is increased by the reaction heat of the oxidation reaction. Then, the high temperature exhaust gas flows into the DPF 62, so that the aforementioned particles collected in the DPF 62 are burned and removed and thus the DPF 62 is regenerated.

The exhaust shutter valve 64 is a value capable of adjusting exhaust pressure in the exhaust passage 60 by adjusting an opening degree of the exhaust shutter valve 64. The exhaust shutter valve 64, for example, may be used in order to increase the exhaust pressure in the exhaust passage 60 when a part of exhaust gas flowing through the exhaust passage 60 is recirculated to the intake passage 50 by a high pressure EGR passage 70 to be described later.

In the present embodiment, the high pressure EGR passage 70 and a low pressure EGR passage 80 are connected to the intake passage 50 and the exhaust passage 60 and can recirculate a part of the exhaust gas flowing through the exhaust passage 60 to the intake passage 50.

The high pressure EGR passage 70 is connected between the intercooler 58 and the surge tank 52 in the intake passage 50 and between the aforementioned exhaust manifold and the turbine 53b of the turbo charger 53 in the exhaust passage 60. The high pressure EGR passage 70 is provided therein with an electromagnetic high pressure EGR valve 72 that regulates the flow rate of the exhaust gas recirculated to the intake passage 50 through the high pressure EGR passage 70.

On the other hand, the low pressure EGR passage 80 is connected to a portion between the air cleaner 51 and the compressor 53a of the turbo charger 53 in the intake passage 50 and a portion between the DPF 62 and the exhaust shutter valve 64 in the exhaust passage 60. The low pressure EGR passage 80 is provided with an EGR cooler 81 that cools the exhaust gas recirculated to the intake passage 50 through the low pressure EGR passage 80 and an electromagnetic low pressure EGR valve 82 that regulates the flow rate of the exhaust gas recirculated through the low pressure EGR passage 80.

Figure 3:
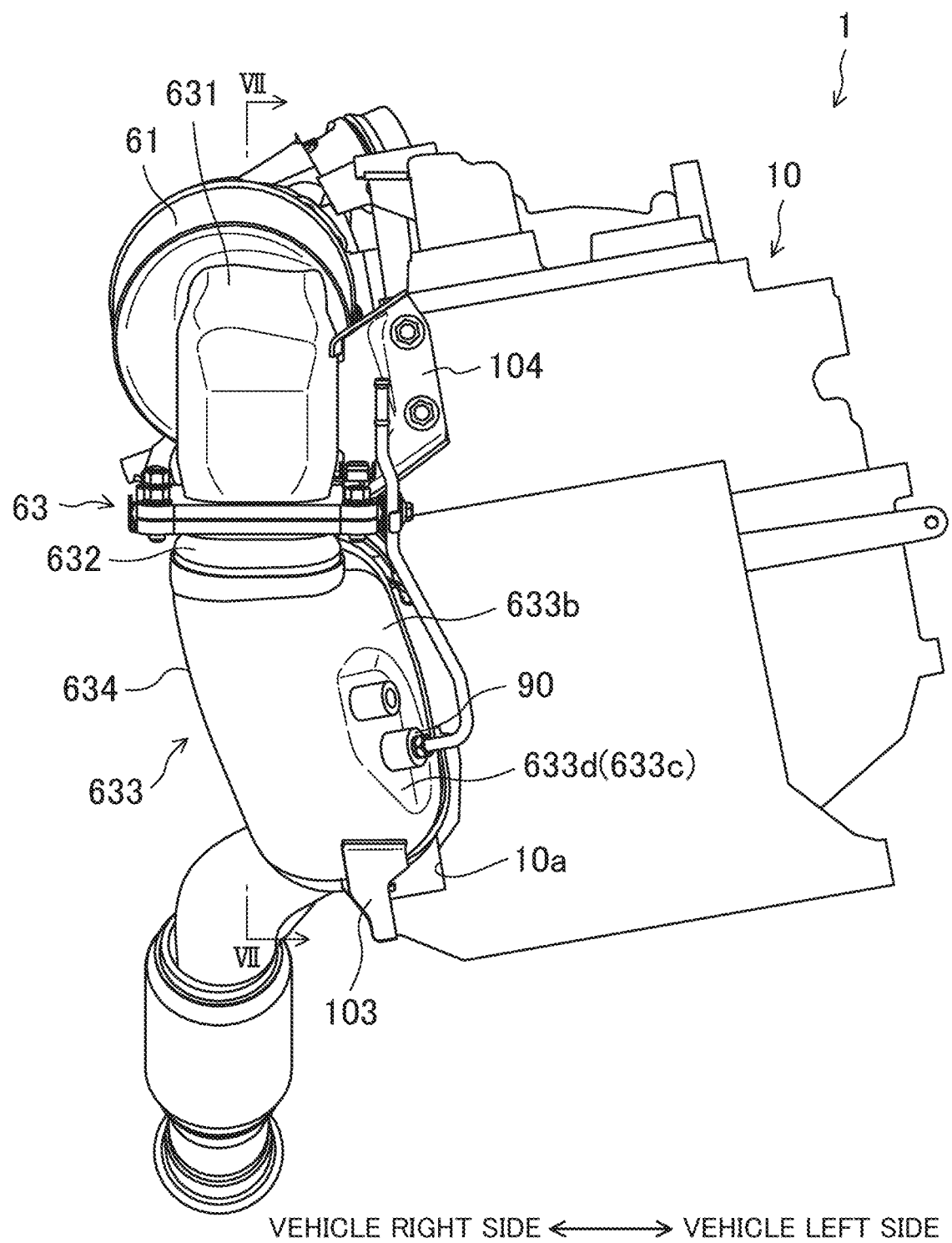
FIG. 3 is a front view when the engine is viewed from a vehicle front side.

FIG. 2 is a side view when the engine 1 is viewed from the vehicle right side. FIG. 3 is a front view when the engine 1 is viewed from the vehicle front side. FIG. 3 does not illustrate elements (the intake passage 50 and the like) related to the intake system and elements (the high pressure EGR passage 70 and the like) related to the EGR system.

In the present first embodiment, as illustrated in FIG. 2, the upstream portion of the exhaust passage 60 in the exhaust flow direction (an upstream side in the exhaust flow direction from a connection portion with the low pressure EGR passage 80) is disposed on the vehicle right side with respect to the engine body 10. The turbine 53b of the turbo charger 53, the oxidation catalyst 61, the connection passage 63, and the DPF 62 are supported to the right side wall portion 10a of the engine body 10 (strictly, a right side wall portion of the cylinder block 12 and a right side wall portion of the cylinder head 13).

As illustrated in FIG. 2, the turbine 53b of the turbo charger 53 is supported to an upper portion of the center of the right side wall portion 10a in the vehicle front and rear direction via the turbine case 53d. The compressor 53a of the turbo charger 53 is disposed on the vehicle rear side of the turbine 53b.

Figure 5:
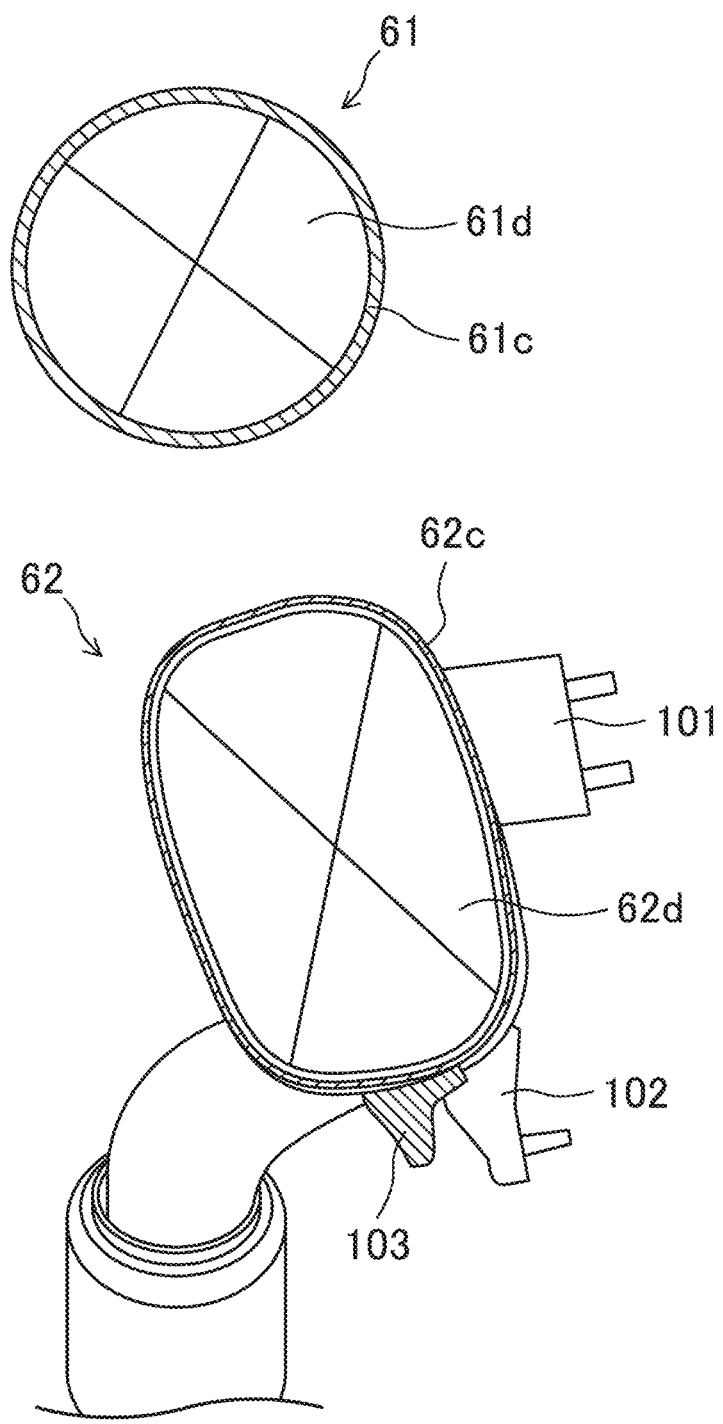
FIG. 5 is a sectional view of the exhaust device taken along line V-V of FIG. 2.

As illustrated in FIG. 2, the oxidation catalyst 61 is disposed on the vehicle front side of the turbine 53b. The oxidation catalyst 61 is supported to the right side wall portion 10a so as to extend in the cylinder row direction when viewed from the vehicle right side such that a catalyst inlet 61a is located on the vehicle rear side and a catalyst outlet 61b is located on the vehicle front side. The connection passage 63 is connected to the catalyst outlet 61b of the oxidation catalyst 61. As illustrated in FIG. 2, the oxidation catalyst 61 is inclined and further positioned downward to approach a connection portion (that is, the catalyst outlet 61b) with the connection passage 63. Specifically, the oxidation catalyst 61 is inclined downward toward the vehicle front side. In the present first embodiment, as illustrated in FIG. 5, the oxidation catalyst 61 has a circular transverse section. As illustrated in FIG. 5, the oxidation catalyst 61 is configured such that an oxidation catalyst converter 61d is received in a catalyst case 61c.

Figure 4:
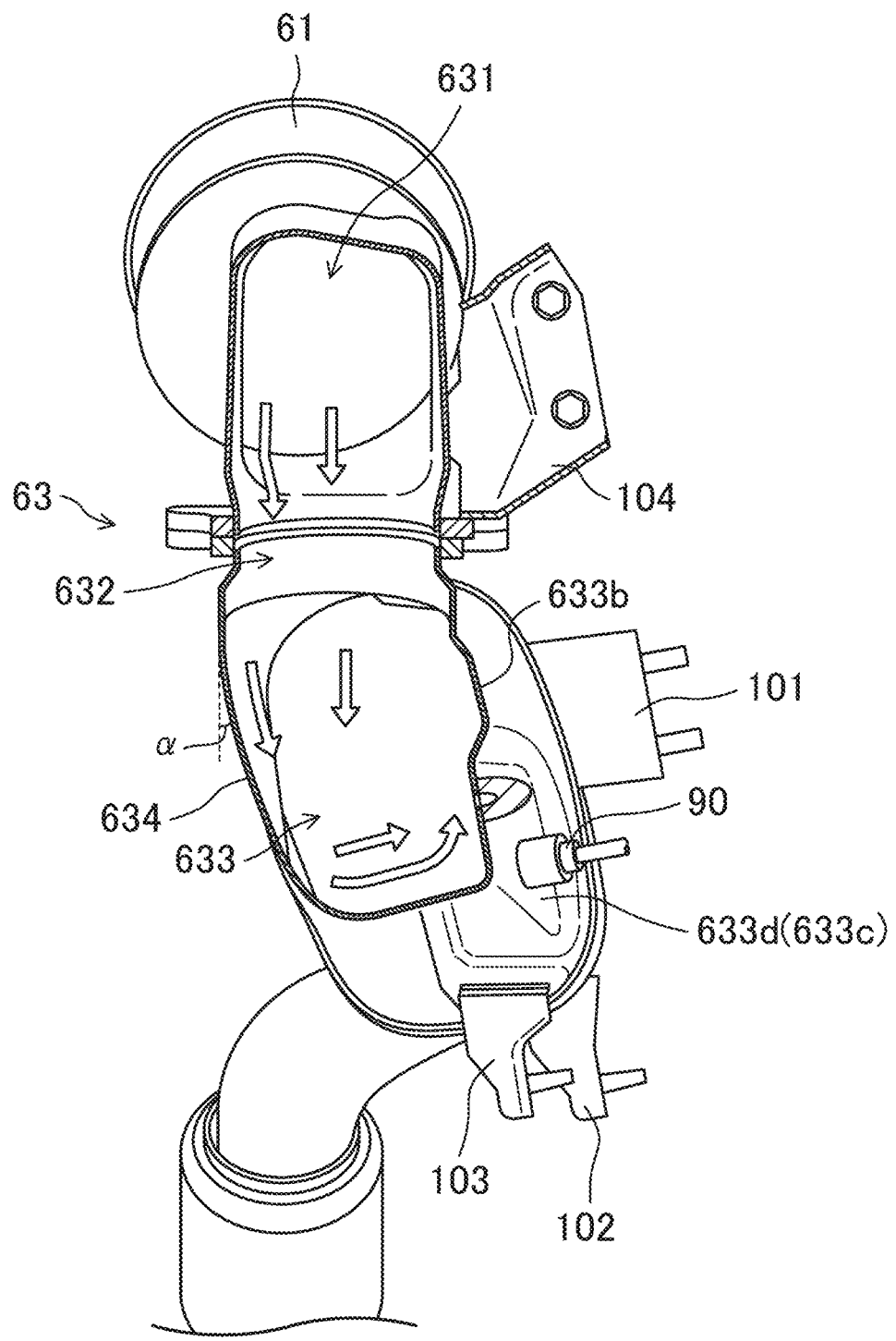
FIG. 4 is a sectional view of the exhaust device taken along line IV-IV of FIG. 2.

As illustrated in FIG. 2 and FIG. 3, the DPF 62 is disposed below of the oxidation catalyst 61 and is adjacent to the oxidation catalyst 61. The DPF 62 extends in the cylinder row direction when viewed from the vehicle right side such that a filter inlet 62a is disposed to the vehicle front and a filter outlet 62b is disposed to the vehicle front. As illustrated in FIG. 5, the DPF 62 has a flat transverse section including a pair of opposing short sides and a pair of opposing long sides. The DPF 62 is disposed so that the aforementioned pair of long sides in the aforementioned flat shape extends in a vertical direction, that is, the pair is long in the vertical direction and short in the vehicle width direction. More specifically, as illustrated in FIG. 3 to FIG. 5, the DPF 62 extends in the vertical direction and is disposed downward to approach the right side wall portion 10a of the engine body 10. That is, the DPF 62 is inclined left and downward.t.

As illustrated in FIG. 5, the DPF 62 is configured such that a filter body 62d is received in a filter case 62c.

An outlet cone 67 is attached to the filter outlet 62b of the DPF 62. As illustrated in FIG. 2, when viewed from the vehicle right side, the outlet cone 67 has a lower portion extending straight toward the vehicle rear side and an upper portion extending obliquely downward toward the vehicle rear side. A first bracket 101 is attached to the upper portion of the outlet cone 67. The first bracket 101 is attached and fixed to the right side wall portion 10a of the engine body 10 via two bolts. Furthermore, a second bracket 102 is attached to the lower portion of the outlet cone 67. The second bracket 102 is attached and fixed to the right side wall portion 10a via a bolt. Moreover, a third bracket 103 is attached to a portion in the vicinity of the filter inlet 62a in the lower portion of the DPF 62. The third bracket 103 is attached and fixed to the right side wall portion 10a via a bolt.

Figure 7:
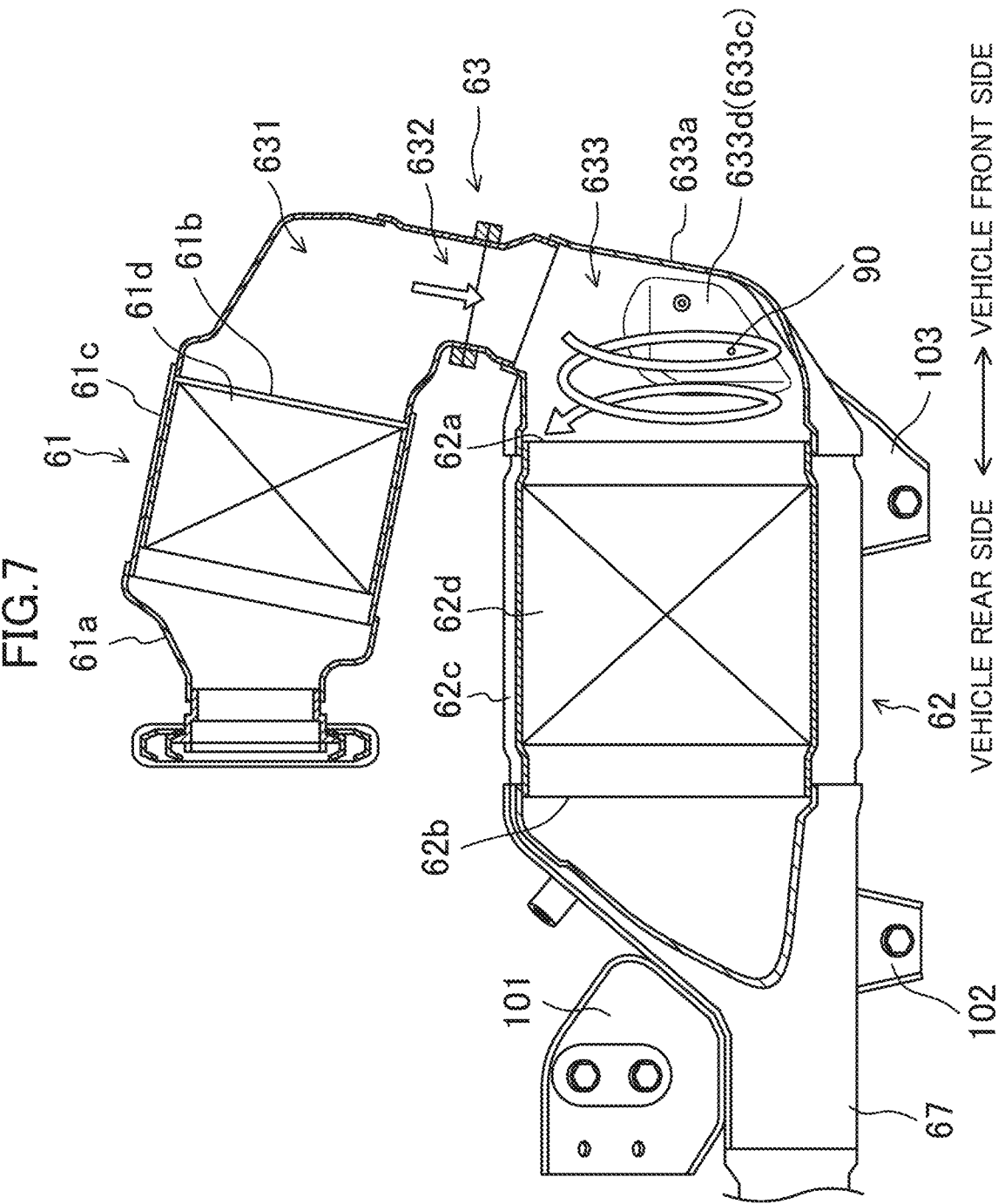
FIG. 7 is a sectional view of the exhaust device taken along line VII-VII of FIG. 3.

As illustrated in FIG. 2 and FIG. 7, the connection passage 63 is disposed closer to the vehicle front side than the oxidation catalyst 61 and the DPF 62 are. The connection passage 63 has a U shape to connect the catalyst outlet 61b of the oxidation catalyst 61 and the filter inlet 62a of the DPF 62 to each other. When viewed from a direction perpendicular to the surface of the right side wall portion 10a of the engine body 10 (that is, when viewed from the vehicle right side), the connection passage 63 is disposed downward to approach the DPF 62 as a whole, that is, the connection passage 63 is disposed obliquely downward. The connection passage 63 has an introduction portion 631 connected to the catalyst outlet 61b, a small cross-sectional area portion 632 extending downward from the introduction portion 631 and having a flow passage cross-sectional area smaller than the area of the aforementioned transverse section of the DPF 62, and an enlarged portion 633 extending to the vehicle rear side from a lower end portion of the small cross-sectional area portion 632 and having a flow passage cross-sectional area enlarged to be approximately as large as the area of the aforementioned transverse section of the DPF 62. That is, the connection passage 63 partially has the small cross-sectional area portion 632 the flow passage cross-sectional area of which is smaller than the area of the aforementioned transverse section of the DPF 62.

As illustrated in FIG. 2 and FIG. 7, the introduction portion 631 extends slightly obliquely downward toward the vehicle front side from the catalyst outlet 61b and then extends slightly obliquely downward to the vehicle rear side. As illustrated in FIG. 3, a fourth bracket 104 is attached to a wall portion of the introduction portion 631 the vehicle left side. The fourth bracket 104 is attached and fixed to the front end portion of the right side wall portion 10a of the engine body 10 via a bolt.

As illustrated in FIG. 2 and FIG. 7, the small cross-sectional area portion 632 is disposed to extend in the vertical direction. Specifically, the small cross-sectional area portion 632 is disposed to extend slightly obliquely downward to the vehicle rear side. Therefore, the connection passage 63 is connected to the oxidation catalyst 61 and the DPF 62 such that the small cross-sectional area portion 632 extends in the vertical direction. As illustrated in FIG. 4, the small cross-sectional area portion 632 has a connection portion to the enlarged portion 633 larger in diameter than other portions of the small cross-sectional area portion 632. In the enlarged portion, the flow passage cross-sectional area of the small cross-sectional area portion 632 is larger than the area of the aforementioned transverse section of the DPF 62.

As illustrated in FIG. 2 and FIG. 7, the enlarged portion 633 extends from the lower end of the small cross-sectional area portion 632 so as to be widened downward toward the vehicle rear side. The enlarged portion 633 is gradually enlarged toward the vehicle rear side such that the flow passage cross-sectional area of a connection portion with the filter inlet 62a of the DPF 62 is approximately as large as the area of the aforementioned transverse section of the DPF 62. Specifically, as illustrated in FIG. 7, in the enlarged portion 633, an upper portion is inclined upward toward the vehicle rear side and a lower portion extends obliquely downward toward the vehicle rear side.

As illustrated in FIG. 2 and FIG. 7, a front wall portion 633a of the enlarged portion 633 to the vehicle front side extends obliquely downward to approach the DPF 62 at an angle approximately identical to inclination angles of the introduction portion 631 and the small cross-sectional area portion 632, that is, the front wall portion 633a extends obliquely downward to the vehicle rear side.

Figure 6:
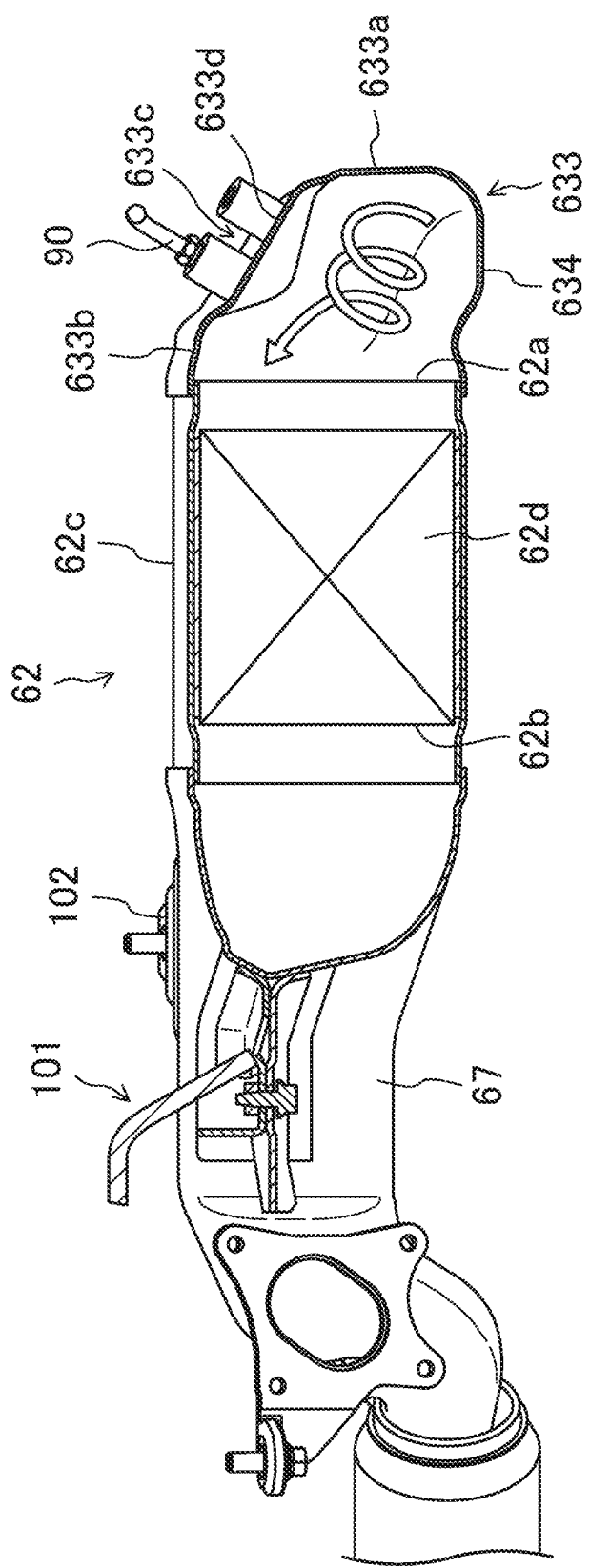
FIG. 6 is a sectional view of the exhaust device taken along line VI-VI of FIG. 2.

As illustrated in FIG. 3 and FIG. 4, a wall portion of the enlarged portion 633 on the vehicle right side (that is, a portion on a peripheral wall of the enlarged portion 633 far from the right side wall portion 10a of the engine body 10) and a wall portion of the enlarged portion 633 to the vehicle left side (hereinafter referred to as a left side wall portion 633b) extend obliquely downward to the vehicle left side. Furthermore, as illustrated in FIG. 6, the wall portion of the enlarged portion 633 on the vehicle right side and the left side wall portion 633b extend obliquely leftward toward the vehicle rear side. Particularly, the wall portion of the enlarged portion 633 to the vehicle right side extends downward to the vehicle rear side and is curved and inclined (that is, to the vehicle left side) so as to approach the right side wall portion 10a of the engine body 10. Although details will be described later, the wall portion of the enlarged portion 633 on the vehicle right side has the aforementioned configuration, so that a part of exhaust gas flowing into the enlarged portion 633 by passing through the small cross-sectional area portion 632 swirls along the peripheral wall of the enlarged portion 633. That is, the wall portion of the enlarged portion 633 on the vehicle right side constitutes a guide wall portion 634 that allows the exhaust gas having passed through the small cross-sectional area portion 632 to swirl along the peripheral wall of the enlarged portion 633. In the following description, the wall portion of the enlarged portion 633 on the vehicle right side is referred to as the guide wall portion 634.

As illustrated in FIG. 4, an inner surface of the guide wall portion 634 extends continuously to an inner surface of the small cross-sectional area portion 632 on the vehicle right side. Furthermore, the inner surface of the guide wall portion 634 is not located to the vehicle right side from the small cross-sectional area portion 632. That is, when the small cross-sectional area portion 632 is viewed from above, the inner surface of the guide wall portion 634 and at least a part of the small cross-sectional area portion 632 overlap each other.

As illustrated in FIG. 4, a lower portion of the guide wall portion 634 is curved and inclined upward toward the vehicle left side.

As illustrated in FIG. 3, FIG. 4, and FIG. 6, the left side wall portion 633b of the enlarged portion 633 is formed with a concave portion 633c recessed toward the vehicle right side. The concave portion 633c is provided with a flat planar portion 633d that is not curved. As illustrated in FIG. 3, an exhaust gas sensor 90 is connected to the planar portion 633d of the concave portion 633c to detect the state of exhaust gas. That is, the exhaust gas sensor 90 is connected to the concave portion 633c of the left side wall portion 633b that is a portion on the peripheral wall of the enlarged portion 633, which faces the guide wall portion 634. The exhaust gas sensor 90, for example, is an exhaust temperature sensor for detecting the temperature of the exhaust gas or an exhaust pressure sensor for detecting the pressure of the exhaust gas in the exhaust passage.

As in the present first embodiment, when the small cross-sectional area portion 632 having a flow passage cross-sectional area smaller than the area of the transverse section of the DPF 62 is formed in the connection passage 63, the exhaust gas is collected in a narrow range when passing through the small cross-sectional area portion 632 and then flows into the DPF 62. When the exhaust gas collected in the narrow range flows into the DPF 62 as is, since deviation occurs in the velocity distribution of the exhaust gas flowing into the DPF 62, exhaust emission control performance of the DPF 62 may deteriorate. Furthermore, if the deviation occurs in the velocity distribution of the exhaust gas flowing into the DPF 62, when the DPF 62 is regenerated, the temperature distribution of the DPF 62 is not uniform, so that the regeneration of the DPF 62 may not be appropriately performed. Particularly, in the present first embodiment, since the DPF 62 has a flat shape, the temperature distribution is likely to be non-uniform.

In this regard, in the present first embodiment, the guide wall portion 634 is provided in the enlarged portion 633 to allow the exhaust gas flowing into the enlarged portion 633 to swirl along the peripheral wall of the enlarged portion 633, thereby making the velocity distribution of the exhaust gas flowing into the DPF 62 as uniform as possible. Hereinafter the flow of the exhaust gas in the connection passage 63 will be described.

As illustrated in FIG. 7, the exhaust gas flowing into the introduction portion 631 by passing through the oxidation catalyst 61 flows toward the small cross-sectional area portion 632 along the wall surface of the introduction portion 631. The exhaust gas flowing into the small cross-sectional area portion 632 is collected in a narrow range when passing through the small cross-sectional area portion 632.

As illustrated in FIG. 4, the exhaust gas having passed through the small cross-sectional area portion 632 flows along the guide wall portion 634 of the enlarged portion 633. As described above, since the guide wall portion 634 extends downward to the vehicle rear side and is curved and inclined to the vehicle left side, flow components on the vehicle rear side and the vehicle left side are applied to the exhaust gas flowing along the guide wall portion 634. Furthermore, since the lower portion of the guide wall portion 634 is curved and inclined upward toward the vehicle left side, flow components on the vehicle left side and the upper side are applied to the exhaust gas having reached the lower portion of the guide wall portion 634. In this way, as illustrated in FIG. 4, the exhaust gas in the enlarged portion 633 rises upward along the left side wall portion 633b in the portion of the enlarged portion 633 on the vehicle left side. As a consequence, in the enlarged portion 633, the exhaust gas flows toward the DPF 62 and swirls along the peripheral wall of the enlarged portion 633.

The exhaust gas swirls along the peripheral wall of the enlarged portion 633, so that the exhaust gas is spread over the entire transverse section of the enlarged portion 633. Since the flow passage cross-sectional area of the enlarged portion 633 is finally approximately identical to the area of the transverse section of the DPF 62, when the exhaust gas flows into the DPF 62, the exhaust gas is distributed over the entire transverse section of the DPF 62. In this way, the velocity distribution of the exhaust gas flowing into the DPF 62 can be made as uniform as possible.

An inclination angle $\alpha$ of an acute angle side in an entrance portion of the guide wall portion 634 with respect to a main stream direction of the exhaust gas when viewed from the vehicle front side is set to an angle at which a swirl component is applied to the exhaust gas and exhaust resistance is not generated as much as possible. Specifically, the aforementioned inclination angle $\alpha$ is set to 10° to 20°.

Figure 9:
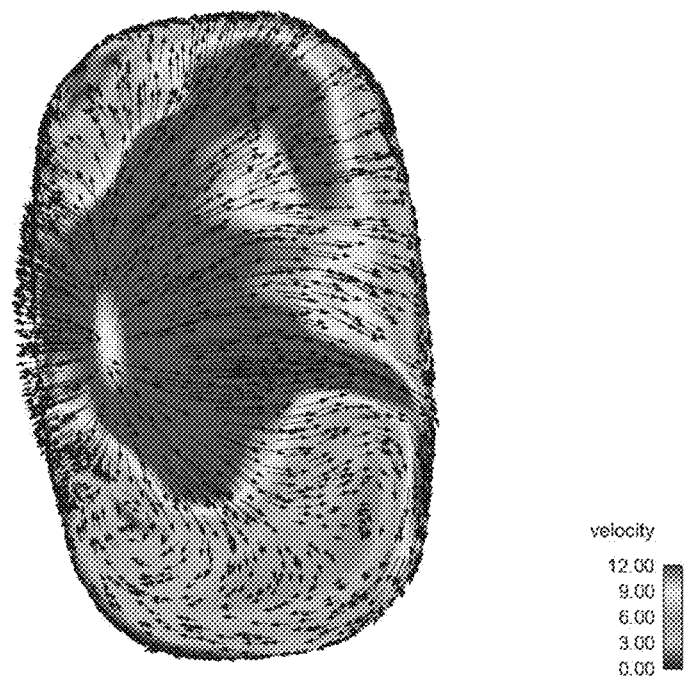
FIG. 9 is a view illustrating a result obtained by analyzing the velocity distribution of the exhaust gas flowing into the DPF by using the model illustrated in FIG. 8.
Figure 10:
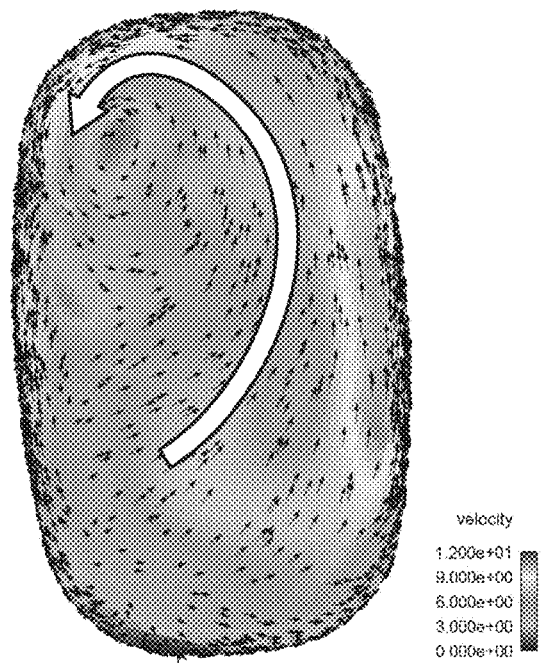
FIG. 10 is a view illustrating a result obtained by analyzing the distribution of the exhaust gas flowing into the DPF by using the exhaust device according to the first embodiment as a model.

FIG. 9 and FIG. 10 illustrate results obtained by simulating an influence of the shape of the connection passage on the velocity distribution of the exhaust gas flowing into the DPF 62. FIG. 9 illustrates the result obtained by computing the velocity distribution of the exhaust gas at the inlet 62a of the DPF 62 by using a model having no enlarged portion 633 according to the present first embodiment (hereinafter referred to as a model of the related structure), and FIG. 10 illustrates the result obtained by computing the velocity distribution of the exhaust gas at the inlet 62a of the DPF 62 by using a model provided with the enlarged portion 633 having the guide wall portion 634 according to the present first embodiment (hereinafter referred to as a model of the present first embodiment). In FIG. 9 and FIG. 10, the direction of an arrow in the drawing indicates the flow direction of the exhaust gas.

Figure 8:
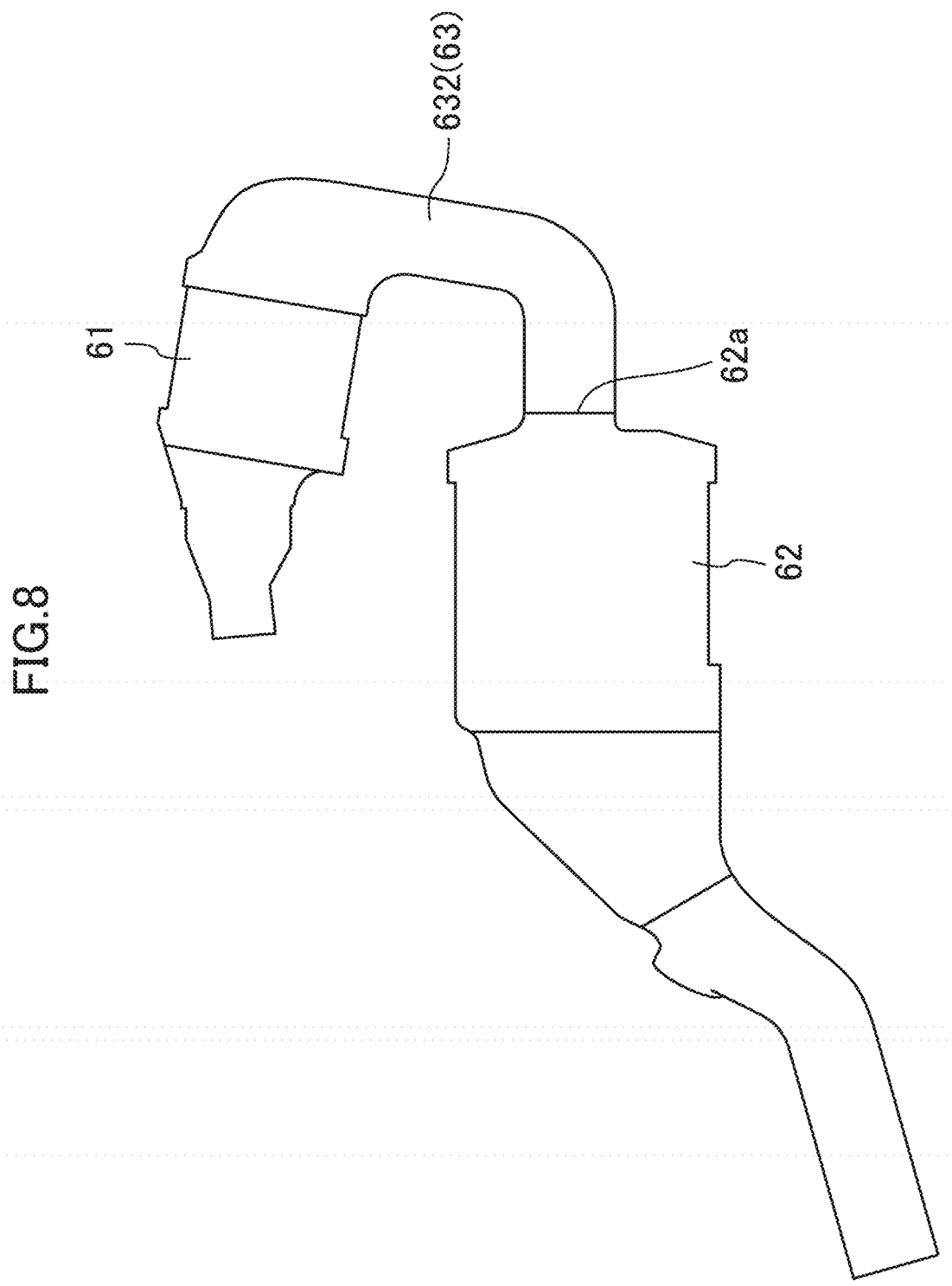
FIG. 8 is a side view of a model of the related exhaust device used to analyze the velocity distribution of exhaust gas flowing into a diesel particulate filter (DPF).

The model of the related structure used in this analysis is illustrated in FIG. 8. The model of the related structure does not have the enlarged portion 633 according to the present first embodiment and has a configuration in which a passage having a flow passage cross-sectional area approximately identical to the small cross-sectional area portion 632 extends to the filter inlet 62a of the DPF 62. The model of the related structure also has the same configuration from the introduction portion 631 to the small cross-sectional area portion 632.

As illustrated in FIG. 9, in the model of the related structure, it can be understood that the exhaust gas collected in a narrow range flows into the DPF 62 as is, resulting in large deviation in the velocity distribution of the exhaust gas. Particularly, it can be understood that the exhaust gas hardly flows at the lower side of the DPF 62. On the other hand, in the model of the present first embodiment, it can be understood that the exhaust gas is swirling along the peripheral wall of the inlet 62a of the DPF 62. Furthermore, it can be understood that the exhaust gas is spread over the entire transverse section of the inlet 62a and thus the velocity distribution of the exhaust gas is uniform. As described above, the enlarged portion 633 having the guide wall portion 634 according to the present first embodiment is provided, so that it is possible to make the velocity distribution of the exhaust gas flowing into the DPF 62 as uniform as possible even though the transverse section of the DPF 62 has a flat shape.

Consequently, in the present first embodiment, since the connection passage 63 partially has the small cross-sectional area portion 632 of which the flow passage cross-sectional area is smaller than the area of the transverse section of the DPF 62, the enlarged portion 633 having a flow passage cross-sectional area enlarged to be approximately identical to the area of the transverse section of the DPF 62 is formed at the connection portion with the DPF 62 in the connection passage 63, and the guide wall portion 634 is provided in the enlarged portion 633 to allow the exhaust gas having passed through the small cross-sectional area portion 632 to swirl along the peripheral wall of the enlarged portion 633, even though the exhaust gas is collected in a narrow range in the small cross-sectional area portion 632, the exhaust gas is swirled by the guide wall portion 634, so that it is possible to make the velocity distribution of the exhaust gas flowing into the DPF 62 as uniform as possible. In this way, it is possible to improve the exhaust emission control performance of the DPF 62. Furthermore, the temperature distribution of the DPF 62 when the DPF 62 is regenerated can be made as uniform as possible, so that the regeneration of the DPF 62 can be appropriately performed.

Furthermore, in the present first embodiment, when viewed from the vehicle front side, the small cross-sectional area portion 632 and the guide wall portion 634 extend in the vertical direction. In this way, the exhaust gas flowing out from the small cross-sectional area portion 632 flows smoothly along the guide wall portion 634. As a consequence, the exhaust gas can be swirled smoothly along the peripheral wall of the enlarged portion 633, so that it is possible to improve the uniformity of the velocity distribution of the exhaust gas flowing into the DPF 62 having the flat shape.

Particularly, in the present first embodiment, the guide wall portion 634 extends continuously to the inner surface of the small cross-sectional area portion 632 on the vehicle right side. Therefore, it is possible to considerably smoothly flow the exhaust gas from the small cross-sectional area portion 632 to the guide wall portion 634. In this way, the exhaust gas can be swirled smoothly along the peripheral wall of the enlarged portion 633.

Moreover, in the present first embodiment, when the small cross-sectional area portion 632 is viewed from above, the inner surface of the guide wall portion 634 and at least a part of the small cross-sectional area portion 632 overlap each other. In this way, at least a part of the exhaust gas having passed through the small cross-sectional area portion 632 reliably flows along the guide wall portion 634. Therefore, in the enlarged portion 633, the exhaust gas can be easily swirled along the peripheral wall of the enlarged portion 633.

Furthermore, in the present first embodiment, the oxidation catalyst 61 is inclined and positioned further downward to approach the connection portion with the connection passage 63. Therefore, the exhaust gas having passed through the oxidation catalyst 61 flows smoothly toward the small cross-sectional area portion 632 extending in the vertical direction. In this way, in the connection passage 63, the exhaust gas flows smoothly to the guide wall portion 634. As a consequence, the exhaust gas can be swirled more smoothly, so that it is possible to further improve the uniformity of the velocity distribution of the exhaust gas flowing into the DPF 62 having the flat shape.

Moreover, in the present first embodiment, when viewed from the direction perpendicular to the surface of the right side wall portion 10a of the engine body 10 (when viewed from the vehicle right side), the connection passage 63 is inclined downward to approach the DPF 62. Therefore, a flow component toward the DPF 62 can be effectively provided to the exhaust gas flowing through the connection passage 63. In this way, the exhaust gas swirling along the peripheral wall of the enlarged portion 633 by the guide wall portion 634 flows smoothly toward the DPF 62. As a consequence, it is possible to further improve the uniformity of the velocity distribution of the exhaust gas flowing into the DPF 62 having the flat shape.

Furthermore, in the present first embodiment, in the guide wall portion 634, the wall portion of the enlarged portion 633 on the vehicle right side extends downward to the vehicle rear side (a direction approaching the DPF 62) and is curved and inclined (that is, to the vehicle left side) so as to approach the right side wall portion 10a of the engine body 10. In this way, the guide wall portion 634 itself can effectively provide a flow component toward the DPF 62 to the exhaust gas. As a consequence, it is possible to further improve the uniformity of the velocity distribution of the exhaust gas flowing into the DPF 62 having the flat shape.

Moreover, in the present first embodiment, the inner surface of the flat planar portion 633d, on which the exhaust gas sensor 90 is provided, is formed as an inclination surface toward the outer peripheral portion of the DPF 62. In this way, the exhaust gas provided with the flow component toward the DPF 62 is guided along the aforementioned inclination surface of the flat planar portion 633d while swirling in the enlarged portion 633, and flows toward the DPF 62. As a consequence, it is possible to further improve the uniformity of the velocity distribution of the exhaust gas flowing into the DPF 62 having the flat shape.

Furthermore, in the present first embodiment, since the exhaust gas sensor 90 is provided on a portion (the left side wall portion 633b) on the peripheral wall of the enlarged portion 633, which faces the guide wall portion 634, when the exhaust gas is swirled by the guide wall portion 634, the exhaust gas sensor 90 does not become an obstacle. In this way, it is possible to further improve the uniformity of the velocity distribution of the exhaust gas flowing into the DPF 62 having the flat shape.

Embodiment 2

Hereinafter a second embodiment will be described in detail with reference to the drawings. In the following description, parts common to the first embodiment are denoted by the same reference numerals and a detailed description thereof will be omitted.

Figure 11:
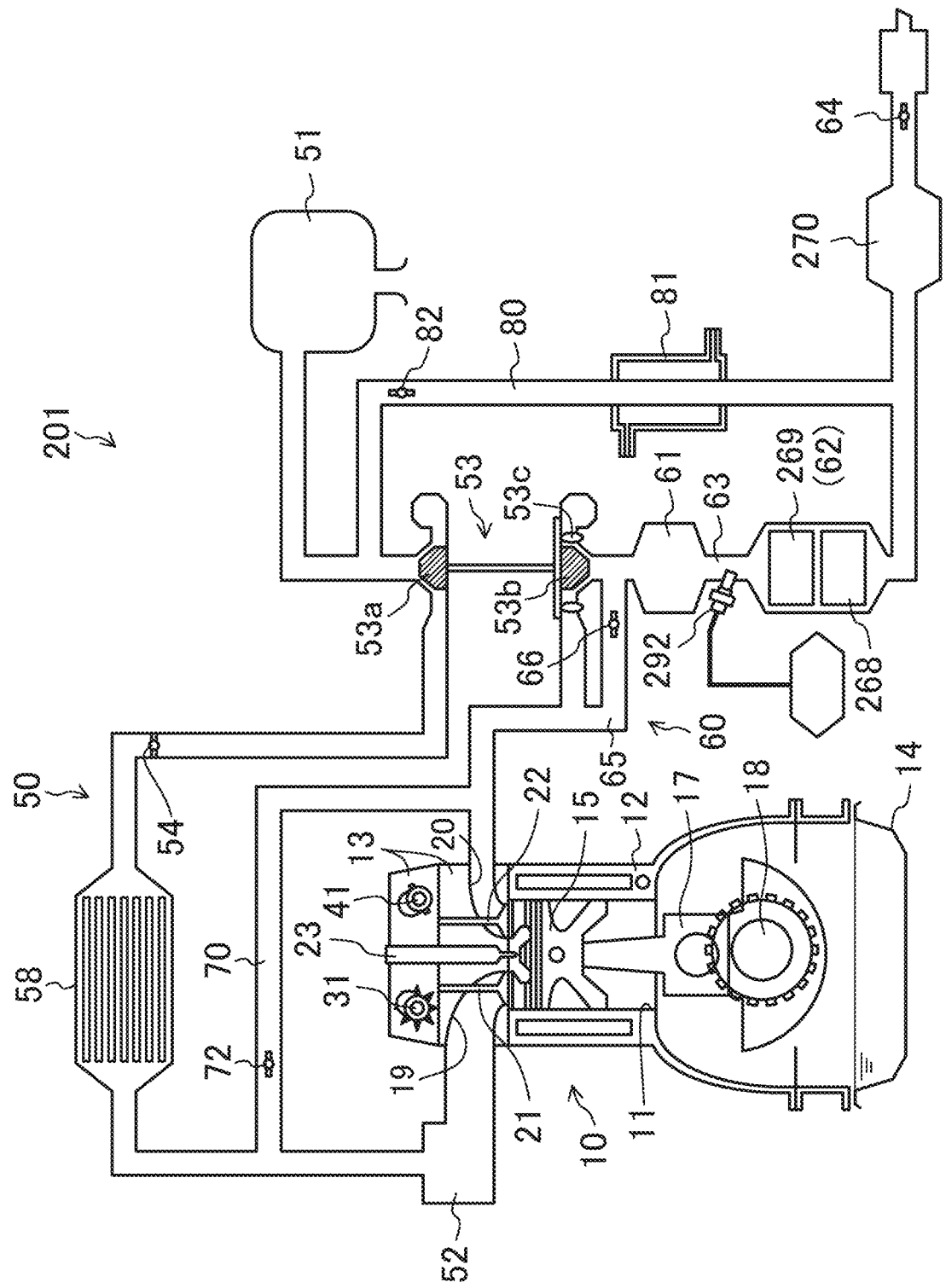
FIG. 11 is a schematic configuration view of an engine provided with an exhaust device according to a second embodiment.

FIG. 11 illustrates an engine 201 provided with an exhaust device of a second embodiment. In the present embodiment 2, in the engine 201, a first selective catalytic reduction catalyst (hereinafter referred to as a first SCR catalyst 268 using the abbreviation of selective catalytic reduction), which reduces $NO_x$ in exhaust gas by a supplied reducing agent, is disposed adjacent to a downstream side of the DPF 62 in the exhaust flow direction. Furthermore, in the present embodiment 2, a second selective catalytic reduction (hereinafter a second SCR catalyst 269), which has the same function as that of the aforementioned first SCR catalyst 268, is supported on the DPF 62. Moreover, the present embodiment 2, in the connection passage 63, a urea injector 292 (a reducing agent supply device) is disposed to supply ammonia to the first and second SCR catalysts 268 and 269 as the reducing agent. Furthermore, in the present embodiment 2, a slip catalyst 270 is provided at a portion on a downstream side of the exhaust passage 60 in the exhaust flow direction from the low pressure EGR passage 80 and an upstream side of the exhaust passage 60 in the exhaust flow direction from the exhaust shutter valve 64 so as to oxidize and purify unreacted ammonia discharged from the first and second SCR catalysts 268 and 269.

The first and second SCR catalysts 268 and 269 absorb the ammonia generated from the urea $((NH_2)_2CO)$ injected from the urea injector 292, and purifies the absorbed ammonia by reacting (reducing) the absorbed ammonia with $NO_x$ in the exhaust gas. The urea injected from the urea injector 292 flows through the connection passage 63 due to the flow of the exhaust gas. The ammonia is generated when the urea flowing through the connection passage 63 is subjected to a thermal decomposition reaction or a hydrolysis reaction in the connection passage 63. The ammonia itself, instead of the urea, may be supplied, or a precursor of the ammonia, other than the urea, may be supplied.

Figure 12:
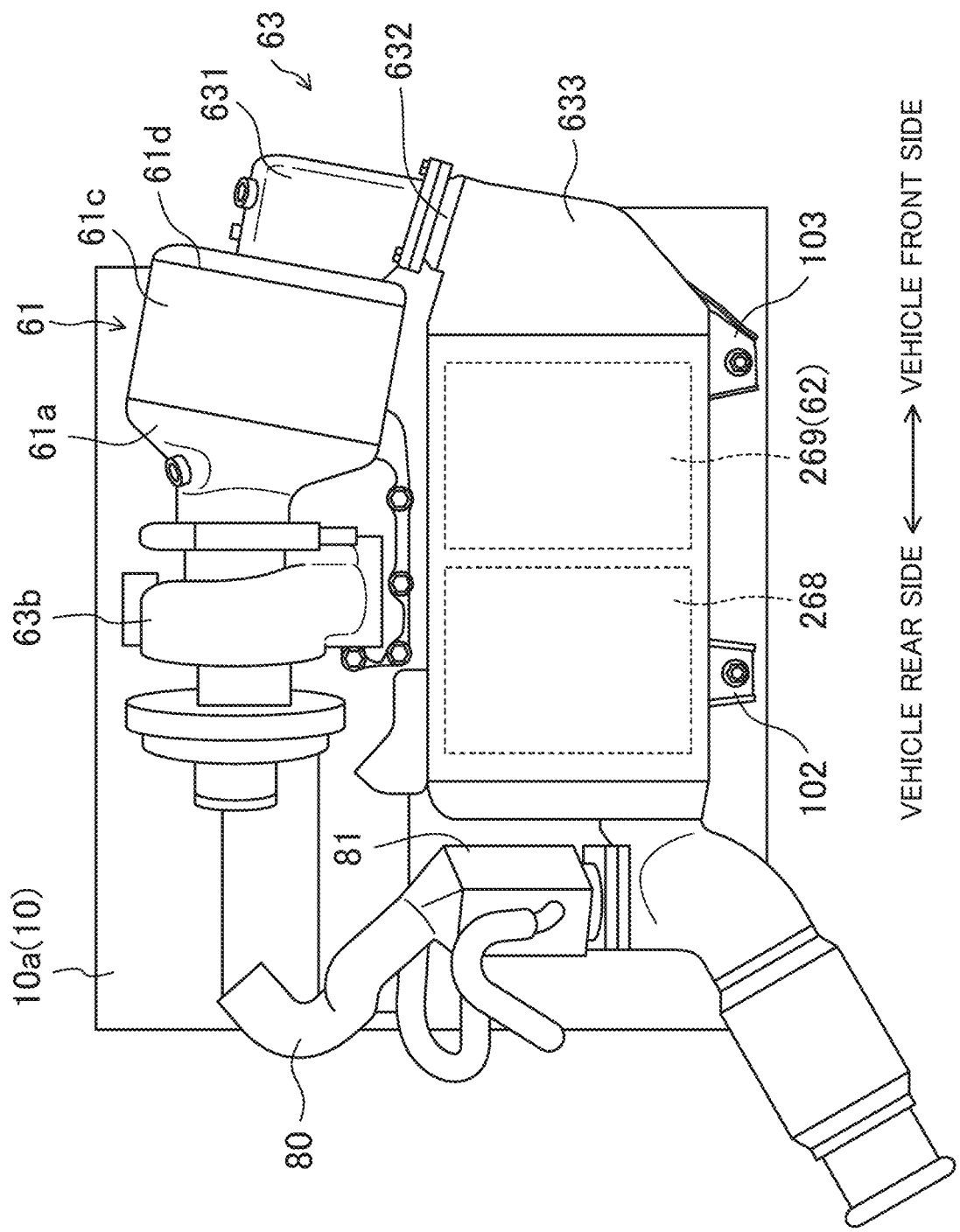
FIG. 12 is a side view when the engine according to the second embodiment is viewed from the vehicle right side.
Figure 13:
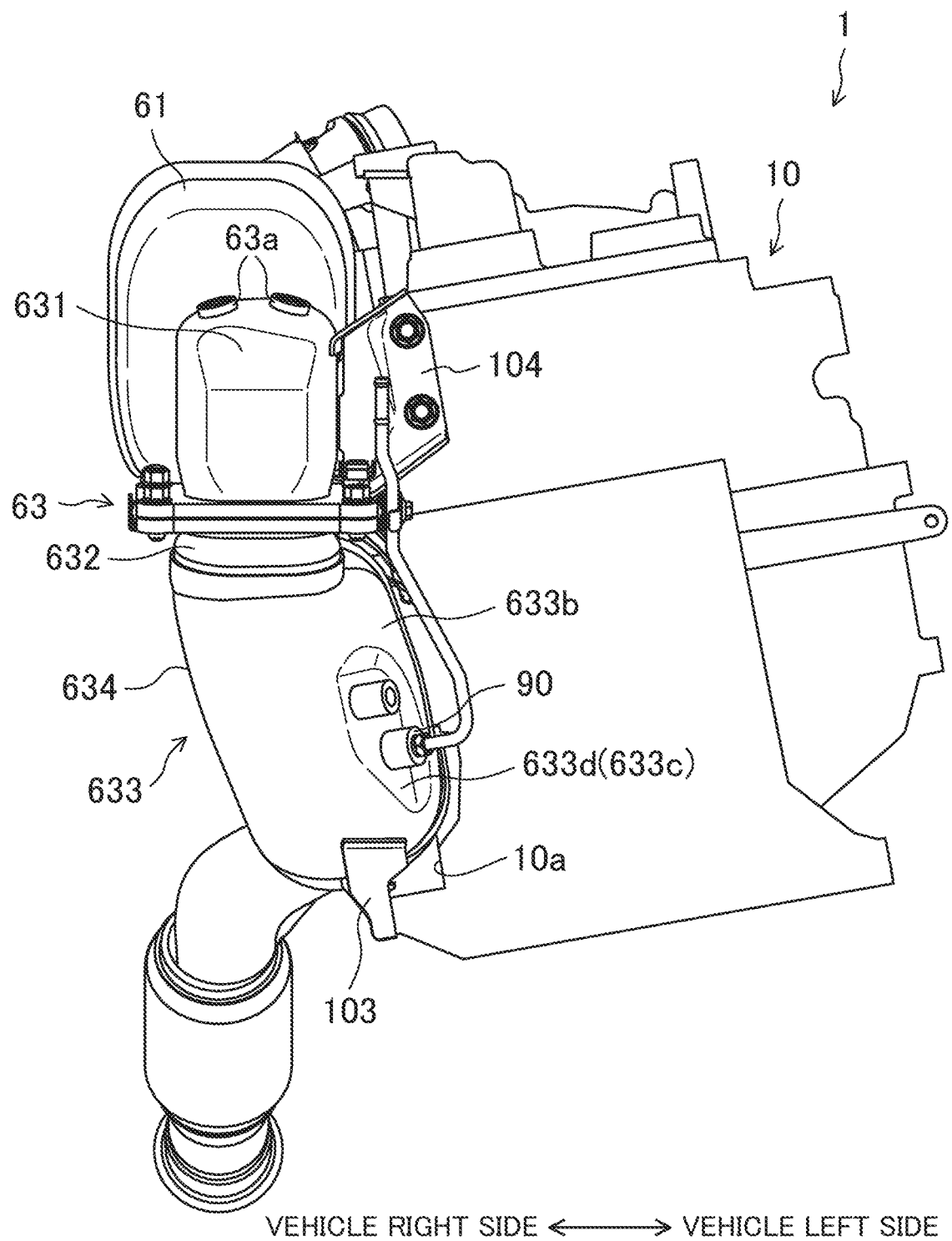
FIG. 13 is a front view when the engine according to the second embodiment is viewed from the vehicle front side.

FIG. 12 is a side view when the engine 201 of the present embodiment 2 is viewed from the vehicle right side. FIG. 13 is a front view when the engine 201 is viewed from the vehicle front side. FIG. 12 and FIG. 13 do not illustrate the elements (the high pressure EGR passage 70, the low pressure EGR passage 80 and the like) related to the EGR system.

Also in the present embodiment 2, as illustrated in FIG. 12, the upstream portion of the exhaust passage 60 in the exhaust flow direction (the upstream side in the exhaust flow direction from the connection portion with the low pressure EGR passage 80) is disposed on the vehicle right side with respect to the engine body 10. The turbine 53b of the turbo charger 53, the oxidation catalyst 61, the connection passage 63, the DPF 62, and the first SCR catalyst 268, and the second SCR catalyst 269 are supported to the right side wall portion 10a of the engine body 10 (strictly, the right side wall portion of the cylinder block 12 and the right side wall portion of the cylinder head 13).

In the present embodiment 2, as illustrated in FIG. 12, the DPF 62 and the first SCR catalyst 268 are received in the same case adjacent to each other in the vehicle front and rear direction. That is, the second SCR catalyst 269 and the first SCR catalyst 268 supported on the DPF 62 are disposed adjacent to each other in the vehicle front and rear direction. In order to dispose the DPF 62 and the first SCR catalyst 268 adjacent to each other, the aforementioned case extends long to the vehicle rear side as compared with the aforementioned first embodiment. Similarly to the aforementioned first embodiment, the DPF 62 has a flat transverse section including a pair of opposite short sides and a pair of opposite long sides and is disposed to be long in the vertical direction and short in the vehicle width direction. Similarly to the DPF 62, each of the first and second SCR catalysts 268 and 269 also has a flat transverse section including a pair of opposite short sides and a pair of opposite long sides and is disposed to be long in the vertical direction and short in the vehicle width direction.

Also in the present embodiment 2, similarly to the aforementioned first embodiment, the DPF 62 is disposed on the lower side of the oxidation catalyst 61 and is adjacent to the oxidation catalyst 61. Therefore, the first and second SCR catalysts 268 and 269 are also disposed on the lower side of the oxidation catalyst 61

As illustrated in FIG. 13, mounting portions 631a for mounting the urea injector 292 and a $NO_x$ sensor (not illustrated) for detecting the concentration of $NO_x$ in the exhaust gas are provided in the upper wall portion of the introduction portion 631 of the connection passage 63.

Also in the present embodiment 2, similarly to the aforementioned first embodiment, the connection passage 63 is provided with the small cross-sectional area portion 632 having a flow passage cross-sectional area smaller than the area of the transverse section of the DPF 62 and the enlarged portion 633 having a flow passage cross-sectional area enlarged to be approximately identical to the area of the transverse section of the DPF 62. Furthermore, similar to the aforementioned first embodiment, the enlarged portion 633 is provided with the guide wall portion 634 that allows the exhaust gas having passed through the small cross-sectional area portion 632 to swirl along the peripheral wall of the enlarged portion 633. Therefore, even though the exhaust gas is collected in a narrow range in the small cross-sectional area portion 632, the exhaust gas is swirled by the guide wall portion 634, so that it is possible to make the velocity distribution of the exhaust gas flowing into the DPF 62 as uniform as possible. In this way, also in the present embodiment 2, it is possible to improve the exhaust emission control performance of the DPF 62. Furthermore, the temperature distribution of the DPF 62 when the DPF 62 is regenerated can be made as uniform as possible, so that the regeneration of the DPF 62 can be appropriately performed.

Furthermore, the exhaust gas is swirled along the peripheral wall of the enlarged portion 633 by the guide wall portion 634, so that the ammonia as the reducing agent is spread over the entire transverse section of the DPF 62. In this way, the distribution of the ammonia supplied to the first and second SCR catalysts 268 and 269 (the distribution on the transverse sections of the first and second SCR catalysts 268 and 269) can be made as uniform as possible. In this way, the ammonia as the reducing agent is absorbed over the entire transverse sections of the first and second SCR catalysts 268 and 269, so that it is possible to improve the exhaust emission control efficiency of the exhaust gas of the first and second SCR catalysts 268 and 269.

Other Embodiments

The technique disclosed herein is not limited to the aforementioned embodiments and may be substituted without departing from the gist of the claims.

For example, in the aforementioned embodiments 1 and 2, the engine body 10 is a diesel engine; however, the technique disclosed herein is not limited thereto and the engine body 10 may be a gasoline engine supplied with fuel including gasoline as a main component. In such a case, the particulate collection filter is not a diesel particulate filter but a gasoline particulate filter.

Furthermore, in the aforementioned embodiments 1 and 2, the engine body 10 is disposed vertically in the engine room of the vehicle; however, the technique disclosed herein is not limited thereto and the engine body 10 may be disposed transversely in the engine room of the vehicle. In such a case, the exhaust passage 60 including the oxidation catalyst 61, the DPF 62 and the like is disposed on the vehicle rear side of the engine body 10.

Moreover, in the aforementioned embodiments 1 and 2, the oxidation catalyst 61 is used as the exhaust emission control catalyst; however, the technique disclosed herein is not limited thereto and for example, a catalyst capable of occluding and reducing $NO_x$ may be used.

The aforementioned embodiments are only simple examples and it should be noted that the scope of the present disclosure is not construed in a limited manner. The scope of the present disclosure is defined by the scope of the appended claims and all modifications and changes belonging to equivalents of the claims are considered to fall within the scope of the present disclosure.

The technique disclosed herein is useful when, in an exhaust device of an engine, a small cross-sectional area portion having a flow passage cross-sectional area smaller than an area of a transverse section of a particulate collection filter is formed in a connection passage that connects an exhaust emission control catalyst and a particulate collection filter to each other.

What is claimed is:
1. An exhaust device of an engine, the device comprising:
an exhaust emission control catalyst provided in an exhaust passage of the engine;

a particulate collection filter disposed on a downstream side of the exhaust passage in an exhaust flow direction from the exhaust emission control catalyst and is adjacent to the exhaust emission control catalyst; and a connection passage that connects the exhaust emission control catalyst and the particulate collection filter to each other, the particulate collection filter has a transverse section having a flat shape and including a pair of opposing short sides and a pair of opposing long sides, the connection passage partially has a small cross-sectional area portion, a flow passage cross-sectional area of which is smaller than an area of the transverse section of the particulate collection filter, an enlarged portion is formed in a connection portion with the particulate collection filter in the connection passage, the enlarged portion having a flow passage cross-sectional area enlarged from upstream to downstream in the exhaust flow direction so as to be as large as the area of the transverse section of the particulate collection filter, and a guide wall portion is provided in the enlarged portion, the guide wall portion deflecting exhaust gas having passed through the small cross-sectional area portion such that the exhaust gas swirls along an entire peripheral wall of the enlarged portion, the connection passage is connected to the exhaust emission control catalyst and the particulate collection filter such that the small cross-sectional area portion extends in the vertical direction, in addition, the guide wall portion is formed at a portion on the peripheral wall of the enlarged portion far from the side wall portion of the engine body, extends in the vertical direction, and is curved downward so as to approach the side wall portion of the engine body, and a lower portion of the guide wall is curved and inclined upward toward the engine body side.

2. The exhaust device of the engine of claim 1, wherein the exhaust emission control catalyst is supported to a side wall portion of an engine body of the engine so as to extend in a cylinder row direction, the particulate collection filter is disposed below the exhaust emission control catalyst, extends in the cylinder row direction, and is supported to the side wall portion of the engine body such that the pair of long sides in the flat shape extends in a vertical direction, the connection passage is connected to the exhaust emission control catalyst and the particulate collection filter such that the small cross-sectional area portion extends in the vertical direction, and the guide wall portion is formed at a portion on the peripheral wall of the enlarged portion far from the side wall portion of the engine body, extends in the vertical direction, and is curved downward so as to approach the side wall portion of the engine body.

3. The exhaust device of the engine of claim 2, wherein the exhaust emission control catalyst is inclined and positioned further downward to approach the connection portion with the connection passage.

4. The exhaust device of the engine of claim 2, wherein the connection passage is inclined downward so as to approach the particulate collection filter when viewed from a direction perpendicular to a surface of the side wall portion of the engine body.

5. The exhaust device of the engine of claim 3, wherein the connection passage is inclined downward so as to approach the particulate collection filter when viewed from a direction perpendicular to a surface of the side wall portion of the engine body.

6. The exhaust device of the engine of claim 2, wherein an exhaust gas sensor is mounted on a portion, on the peripheral wall of the enlarged portion, which faces the guide wall portion, to detect a state of the exhaust gas.

7. The exhaust device of the engine of claim 4, wherein an exhaust gas sensor is mounted on a portion, on the peripheral wall of the enlarged portion, which faces the guide wall portion, to detect a state of the exhaust gas.

8. The exhaust device of the engine of claim 1, further comprising:

a first selective catalytic reduction catalyst disposed adjacent to the downstream side of the particulate collection filter in the exhaust flow direction and reduces NOx in the exhaust gas by a supplied reducing agent; and a reducing agent supply device provided on an upstream portion of the connection passage in the exhaust flow direction from the small cross-sectional area portion so as to supply the reducing agent.

9. The exhaust device of the engine of claim 8, wherein a second selective catalytic reduction catalyst having a function equivalent to a function of the first selective catalytic reduction is supported on the particulate collection filter.

* * * * *